(12) United States Patent
Haghayeghi et al.

(10) Patent No.: US 12,392,518 B2
(45) Date of Patent: *Aug. 19, 2025

(54) INTELLIGENT COMMISSIONING OF BUILDING AUTOMATION CONTROLLERS

(71) Applicant: Schneider Electric Buildings Americas, Inc., Carrollton, TX (US)

(72) Inventors: Babak Haghayeghi, Belmont, LA (US); Kevin Sweeney, Methuen, MA (US); Shawn Lambert, Salem, NH (US); David Keefer, Willshire, OH (US); David Shike, Rockton, IL (US)

(73) Assignee: Schneider Electric Buildings Americas, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,806

(22) Filed: Jan. 16, 2024

(65) Prior Publication Data

US 2024/0151417 A1   May 9, 2024

Related U.S. Application Data

(63) Continuation of application No. 16/474,797, filed as application No. PCT/US2019/014317 on Jan. 18, 2019, now Pat. No. 11,874,011.

(Continued)

(51) Int. Cl.
*F24F 11/58* (2018.01)
*F24F 11/526* (2018.01)
(Continued)

(52) U.S. Cl.
CPC ............ *F24F 11/58* (2018.01); *F24F 11/526* (2018.01); *F24F 11/74* (2018.01); *F24F 11/86* (2018.01)

(58) Field of Classification Search
CPC .......... F24F 11/526; F24F 11/58; F24F 11/74; F24F 11/86; G05B 15/02;
(Continued)

(56) References Cited

U.S. PATENT DOCUMENTS

2002/0091526 A1   7/2002   Kiessling et al.
2005/0040250 A1   2/2005   Wruck
(Continued)

FOREIGN PATENT DOCUMENTS

CA   2735457 A1   9/2011
WO   2016154303 A1   9/2016

OTHER PUBLICATIONS

EP Examination Report issued on Feb. 21, 2002, 8 pages.
(Continued)

*Primary Examiner* — Santosh R Poudel
(74) *Attorney, Agent, or Firm* — Troutman Pepper Locke LLP

(57) ABSTRACT

Systems/methods for intelligent commissioning of an HVAC system provide a control node and at least a first network node coupled to communicate with the control node, the first network node configured to retrieve via a user interface objects configured at the control node, configure at least a second network node using the retrieved objects, and report the configuration of the second network node at the control node. A user interface of a first network node can access the objects at the control node. The first network node can apply the accessed objects to configure a second network node using a commissioning tool. The commissioning tool can be activated specifically for certain authorized HVAC personas or roles. The first network node can report the configuring at the control node. The commissioning tool can be voice-enabled to allow a single user to configure the HVAC system via voice commands.

20 Claims, 9 Drawing Sheets

Related U.S. Application Data

(60) Provisional application No. 62/619,528, filed on Jan. 19, 2018.

(51) Int. Cl.
  *F24F 11/74* (2018.01)
  *F24F 11/86* (2018.01)

(58) Field of Classification Search
  CPC ........ G05B 2219/2614; G05B 19/0426; G05B 2219/2642; G06F 21/604; G06Q 10/00; G06Q 30/018; H04L 63/08; H04L 63/102; Y04S 40/20
  See application file for complete search history.

(56) References Cited

U.S. PATENT DOCUMENTS

| | | |
|---|---|---|
| 2006/0174104 A1 | 8/2006 | Crichton et al. |
| 2010/0070055 A1 | 3/2010 | Kennedy et al. |
| 2010/0075655 A1 | 3/2010 | Howarter et al. |
| 2010/0106815 A1 | 4/2010 | Grohman |
| 2012/0130544 A1 | 5/2012 | Mohan et al. |
| 2012/0147862 A1* | 6/2012 | Poojary .................. H04W 4/33 370/338 |
| 2014/0229618 A1 | 8/2014 | Kumar et al. |
| 2015/0100167 A1 | 4/2015 | Sloo et al. |
| 2015/0148963 A1 | 5/2015 | Klein et al. |
| 2015/0159899 A1 | 6/2015 | Bergman et al. |
| 2015/0256355 A1 | 9/2015 | Pera |
| 2015/0369013 A1* | 12/2015 | Weatherhead .......... E21B 41/00 700/275 |
| 2016/0349725 A1* | 12/2016 | Miura ..................... F24F 11/65 |
| 2017/0051932 A1 | 2/2017 | Chang et al. |
| 2017/0052529 A1 | 2/2017 | Meruva et al. |
| 2017/0053441 A1 | 2/2017 | Nadumane et al. |
| 2017/0082993 A1 | 3/2017 | Narain et al. |
| 2017/0181254 A1 | 6/2017 | Meitl et al. |
| 2017/0195457 A1* | 7/2017 | Smith, II ................ H04L 63/10 |
| 2018/0012173 A1* | 1/2018 | Leen ..................... G06Q 10/06 |
| 2018/0074471 A1* | 3/2018 | Poplawski ............... F24F 11/62 |
| 2018/0075731 A1* | 3/2018 | Frenette ................ G06F 3/0484 |
| 2018/0173195 A1 | 6/2018 | Katole et al. |
| 2018/0217580 A1* | 8/2018 | Jundt ................ G05B 19/4185 |
| 2020/0085673 A1 | 3/2020 | Seo et al. |

OTHER PUBLICATIONS

"EBT Balometer Capture Hood Model EBT731", TSI Incorporated, 2019, 4 pages.

"Handheld VAV Balancing Tool Catalog Page", Johnson Controls, 2013, 2 pages.

"Paul Turner, What is Commissioning?, Dec. 16, 2019, Commissioning Academy for Engineers, https://commissioningandstartup.com/what-is-commissioning/" (Year: 2019).

"Rapid Balance", Honeywell International Inc., 2020, 1 page.

International Search Report and Written Opinion of the International Searching Authority for PCT Application No. PCT/US2019/014317 dated May 23, 2019, 18 pages.

Supplementary European Search Report for application EP 19714979 dated Sep. 7, 2020, 11 pages.

Examination Report dated Jan. 20, 2025, for EP App. 19714979.2, 9 pages.

* cited by examiner

INTELLIGENT COMMISSIONING OF BUILDING AUTOMATION CONTROLLERS

CROSS-REFERENCE TO RELATED APPLICATIONS

This application for patent is a continuation of U.S. Nonprovisional application Ser. No. 16/474,797, entitled "Intelligent Commissioning of Building Automation Controllers," filed Jun. 28, 2019, which is a U.S. National Stage of International Application No. PCT/US2019/014317, entitled "Intelligent Commissioning of Building Automation Controllers," filed Jan. 18, 2019, which claims the benefit of priority to U.S. Provisional Application No. 62/619,528, entitled "Systems and Methods for Intelligent Commissioning," filed Jan. 19, 2018, the foregoing applications being incorporated herein by reference in their entireties.

FIELD OF THE INVENTION

The present disclosure relates generally to commissioning heating, ventilating, and air conditioning (HVAC) systems and more particularly to intelligent commissioning of building automation controllers that are used in HVAC systems.

BACKGROUND OF THE INVENTION

HVAC commissioning generally refers to a procedure or process of verifying HVAC equipment is properly installed, calibrated, and operating according to facility or building specifications. The process often involves employing system integrators who have specialized knowledge in order to correctly commission a building's HVAC system, which can reduce flexibility in selecting staff who are able to perform the required tasks. In a typical arrangement, project managers must direct the activities of HVAC professionals who fulfill the role of a variety of HVAC "personas," such as technicians, electricians, mechanics, plumbers, flow balancers, and the like, to complete the commissioning of controllers and associated HVAC components within a building. Managing this activity, however, can be labor and time intensive, often requiring site visits and tracking down people who performed certain tasks to confirm such tasks were correctly completed.

Consider for example a variable air volume (VAV) HVAC system. Such HVAC systems typically have a number of central plant controllers that control a number of central plant equipment, such as boilers, chillers, air handlers, and cooling towers. Such HVAC systems also have a large number of distributed controllers or control devices that control different types of equipment in each climate-controlled area or space of the building or facility, such as one or more offices or rooms, a wing or corridor, an entire floor, and the like. Collectively, these distributed control devices are referred to as terminal control units (TCU). Examples of TCUs include VAV box units, fan coil units (FCU), heat pump units (HPU), and chilled beam units (CBU). The central plant equipment serve as the source of hot and cold air and water that is provided to the TCUs to regulate the temperatures and humidity in their respective climate-controlled areas or spaces.

TCUs generally need to undergo commissioning after they are physically and electrically installed in the facility or building. This is sometimes referred to as "final" commissioning and varies for each type of TCU, often involving several trained technicians working together. In many instances, a mechanic, plumber, electrician, and/or other technician may need to control a TCU controller to do specific actions, observe the response, take measurements, and then configure the controller with calibration data based on the observations and measurements. Balancing a TCU for a VAV system, for example, involves a skilled flow balancing technician to take precise airflow readings using a special, calibrated instrument at specific high and low flow settings. There may also be a controls technician operating the VAV controller using a specific software application working closely with the flow balancer to command the controller to the desired positions and input the calibration data to the controller. Also, the balancing technician may need to hold a bulky airflow measurement hood over the air outlet while elevated on a ladder or other man-lift equipment. The above commissioning procedure can be time and labor intensive.

Accordingly, a need exists for a way to reduce the complexity and trained labor involved in commissioning of HVAC systems.

SUMMARY OF THE DISCLOSED EMBODIMENTS

Aspects of the present disclosure can help reduce the complexity and labor involved in HVAC system commissioning by, among other things, providing methods and systems for intelligently commissioning building automation controllers in HVAC systems.

In accordance with at least one exemplary embodiment, the present disclosure contemplates a system for intelligent commissioning of HVAC systems that includes a control node configured to control one or more HVAC system components and at least a first network node coupled to communicate with the control node. The control node can configure objects, each object defining one or more configuration parameters for at least one of the HVAC system components. The first network node can access and/or retrieve the configured objects via a user interface of the first network node. Using the retrieved objects, the first network node can configure at least a second network node. Once configuration of the second network node is complete, the first network node can report the configuration of the second network node at the control node.

In accordance with at least one other exemplary embodiment, the present disclosure contemplates a method for intelligent commissioning of HVAC systems. A request to activate a selected HVAC persona can be received at a first network node in the HVAC system. An activation code can be issued to the first network node for activating the selected HVAC persona. Objects can be generated at a control node of an HVAC system, each object defining one or more configuration parameters for at least one HVAC system component. A first network node can detect the generated objects and, based on the generated objects, can configure at least a second network node using voice commands. Once configuration of the second network node is complete, the first network node can validate the configuration of the second network node. The first network node can then report the validated configuration at the control node.

In accordance with at least one other exemplary embodiment, the present disclosure contemplates a method for configuring an HVAC system. The method comprises establishing a connection between a voice-enabled commissioning tool and a control system of the HVAC system, and detecting at least one component of the HVAC system to configure using the voice-enabled commissioning tool. The method additionally comprises providing instructions for configuring the at least one selected component on the voice-enabled commissioning tool, wherein the instructions are based on the type of the at least one selected component. The method further comprises measuring one or more parameters associated with the at least one selected component using at least one sensor device based on the provided instructions and determining, on the voice-enabled commissioning tool, if the one or more measured parameters are acceptable. In response to determining that at least one of the one or more measured parameters is not acceptable, one or more portions of the HVAC system is adjusted using the HVAC system control system.

Additional aspects and advantages will be set forth in part in the description that follows, and in part will be obvious from the description, or may be learned by practice of the present disclosure and/or claims. At least some of these aspects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

BRIEF DESCRIPTION OF THE DRAWINGS

The present disclosure can be understood from the following detailed description either alone or together with the accompanying drawings. The drawings are included to provide a further understanding of the present disclosure, and are incorporated in and constitute a part of this specification. The drawings, which are incorporated in and constitute a part of this specification, illustrate one or more embodiments of the present disclosure and, together with the description, explain certain principles and operation. In the drawings.

DETAILED DESCRIPTION OF THE DISCLOSED EMBODIMENTS

This description and the accompanying drawings illustrate exemplary embodiments and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Figures 1A, 1B:
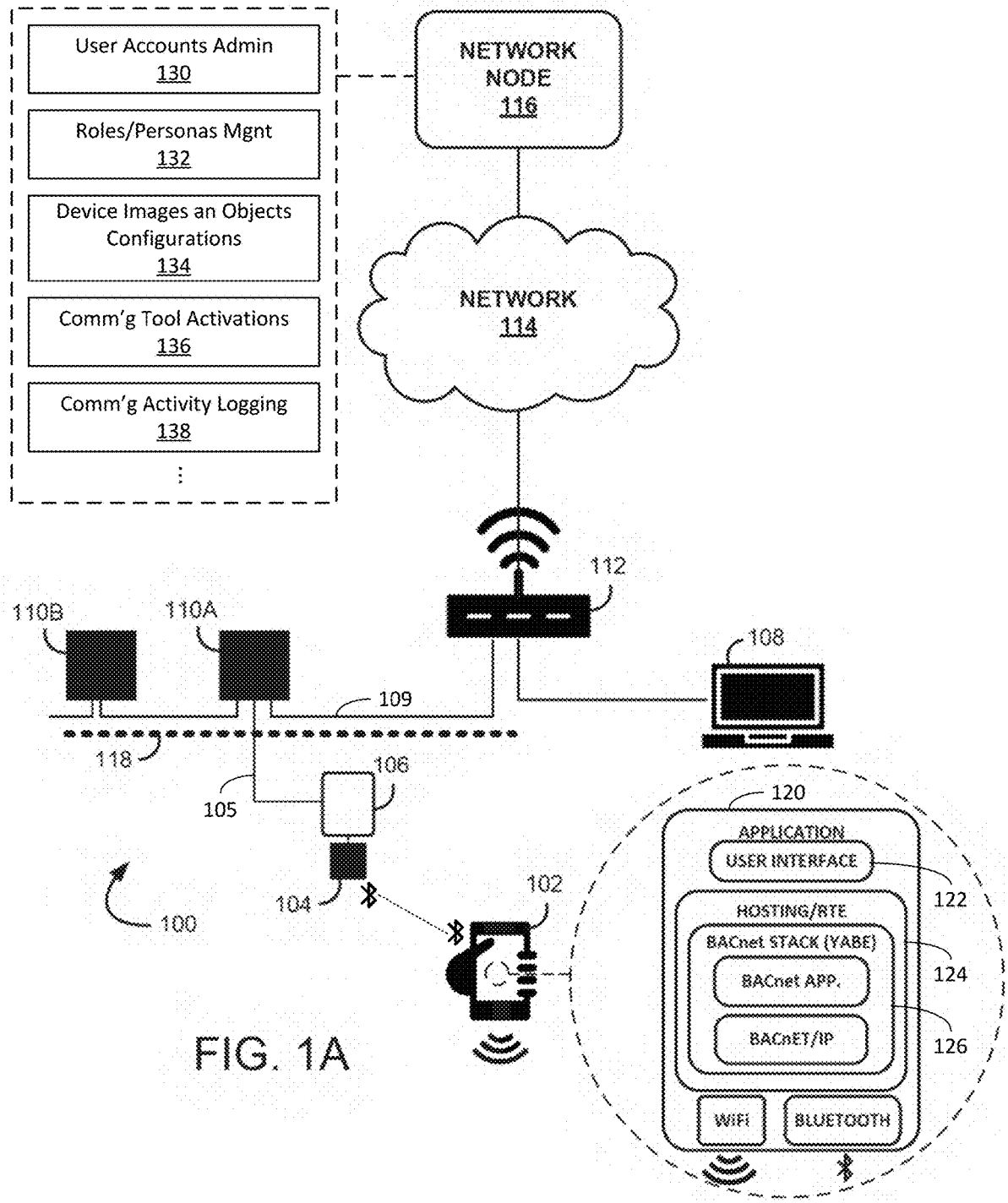
FIG. 1A illustrates an exemplary network system configured to enable intelligent commissioning at a network node in accordance with an exemplary embodiment of the present disclosure.
FIG. 1B illustrates exemplary mobile device configured to enable intelligent commissioning in the network system of FIG. 1A in accordance with an exemplary embodiment of the present disclosure.

Referring to FIGS. 1A and 1B, a schematic view of an exemplary intelligent HVAC commissioning network system 100 is depicted for a facility or building in accordance with the present disclosure. The network system 100 provides facility or building owners and managers with, among other things, the ability to intelligently commission building automation controllers and other devices used in HVAC systems. As the figures show, the HVAC commissioning network system 100 includes a plurality of network nodes, each node representing a device (or several devices) that can be connected to form a part of the network system 100. It is noted that the system components in FIGS. 1A and 1B are not shown in any particular positioning and can be arranged and located as desired, and the depiction of certain components above or below a ceiling 118 is for illustrative purposes only and not a limitation.

As can be seen in FIG. 1A, the network system 100 includes a control node 116, which may be a building management system (BMS) server in some cases, such as an EcoStruxure BMS Server available from Schneider Electric, Inc. The control node 116 is connected directly or indirectly (e.g., cloud-based connection) through a communication network 114 (e.g., a LAN, WAN, the Internet, etc.) to additional network nodes. These additional network nodes may include one or more TCU controllers 110A, 110B that connect to the communication network 114 via a network router 112 and any suitable building network connection 109 (e.g., Ethernet, BACnet/IP, etc.). The TCU controllers 110A, 110B may be multi-purpose, fully programmable, IP based field controllers in some embodiments, such as one of the SmartX series of controllers (e.g., MP-C controllers, MP-V controllers) available from Schneider Electric.

Each TCU controller 110A, 110B may in turn be connected to one or more sensor modules 106, each of which may be for example one of the SmartX series of room sensor modules available from Schneider Electric. Any suitable connection 105 that can support communication between the TCU controllers 110A, 110B and the sensor modules 106 may be used (e.g., BACnet/IP, MSTP, RS485, etc.). Each sensor module 106 operates to monitor a local climate and has controls means (e.g., touchscreen display, buttons, etc.) that a user can manipulate to control the TCU controllers 110A, 110B. This allows for testing, commissioning, and maintenance of equipment connected to the controllers 110A, 110B, including configuring and reconfiguring of the TCU controllers 110A, 110B as needed. The sensor modules 106 may have either an integrated or an add-on wireless adapter 104 (e.g., Wi-Fi, Bluetooth, etc.) that allows a handheld mobile device 102, such as a smart phone or tablet, to connect to and control the TCU controllers 110A, 110B via the sensor modules 106. In the case of an add-on wireless adapter 104, the adapter 104 can be paired once to the mobile device 102 for example via Bluetooth, then simply carried with the mobile device 102 for subsequent uses.

Still additional network nodes that can connect to the communication network 114 in some embodiments may include a computing device 108, such as a laptop or desktop computer. The computing device 108 in some embodiments can be configured to run a commissioning application, including a voice-enabled commissioning application (discussed further herein), and can but need not be located in the same area or room as the sensor modules 106.

As alluded to above, the communication network 114 can be a wired and/or wireless network that uses, for example, physical and/or wireless data links to carry network data among (or between), for example, the network nodes 102, 104, 106, 108, 110A, 110B, 112, and/or 116. The communication network 114 can support voice, push-to-talk (PTT), broadcast video, and/or network data communications by the network nodes 102, 104, 106, 108, 110A, 110B, 112, and/or 116. Wireless network protocols can include, for example, MBMS, CDMA, 1×RTT, GSM, UMTS, HSPA, EV-DO, EV-DO Rev. A, 3GPP LTE, WiMAX, and other wireless network protocols. Wired network protocols can include, for example, Ethernet, Fast Ethernet, Gigabit Ethernet, Local Talk (such as Carrier Sense Multiple Access with collision Avoidance), Token Ring, FDDI, ATM, and other wired network protocols.

In a similar manner, the control node 116 can also use wired and/or wireless data links to carry network data among (or between), for example, the network nodes 102, 104, 106, 108, 110A, 110B, 112, the communication network 114, and/or at a processing node and/or other cloud-based or external control module configured to communicate with the system 100. The control node 116 can be a standalone computing device, computing system, or network component, and may include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, and the like. This allows the control node 116 to, among other things, run multiple different control programs using a variety of protocols, manage alarms, users, schedules, and trend logs, and deliver data directly to users or to other network nodes and devices. An authorized user can log on to the control node 116 to engineer, commission, supervise, and monitor other network nodes and associated modules and devices. Such activities can be accomplished over standard building management communication protocols, such as BACnet, LonWorks, Modbus, and similar standard building management communication protocols.

The BACnet protocol and similar standard building management communication protocols allow building automation equipment from different manufacturers to be connected together and interoperate for sharing data and information, monitoring, and supervisory control purposes. The BACnet protocol for example defines a number of services that are used to communicate between building devices, such as Who-Is, I-Am, Who-Has, I-Have, which are used for device and object discovery. Services such as Read-Property and Write-Property are used for data sharing. Each object defines a set of fields for a given HVAC equipment that identify the equipment and one or more configuration parameters and properties associated with the equipment. For example a fan coil may have fan coil objects, a heat pump may have a heat pump objects, a VAV controller may have a VAV controller objects, and the like, each object specifying a unique identifier for the object and a set of configuration properties and parameters for the respective equipment.

A control application resides within the controllers 110A, 110B that functions to control operation of the HVAC equipment. The control application generally includes objects, which as mentioned above are a collection of configuration parameters and properties that enable or define equipment function, and also "bindings," which are links between objects that allow the exchange of parameter and property values between objects. Examples of configuration parameters and properties for a given HVAC equipment may include temperature and pressure setpoints, high and low operation limits, input/output data, and the like.

As a specific example, a controller application may have a "Point" object that may include Input or Output, which are configured parameters, and Voltage, Current or Resistance, which are also configured parameters, as well as Value, which is a variable runtime property. The controller may also have an "Alarm" object that may include On/Off or OutOfRange, which are configured parameters, and an Alarm condition parameter, and also Value, which is again a variable runtime property (e.g., assert Alarm when Value=On or when Value exceeds 5). By binding the value of the Point object to the value of the Alarm object, the Alarm object can react to the value provided to it by the Point object.

Other objects may include Script programs, which are a set of instructions that determine output value behavior based input values, a Data logging object, which logs input value, Schedule object, which provides time based determination of values, and the like. Certain objects, such as VAV objects that form the basis of a VAV control application, are more complex, with multiple properties and both configured and runtime values. These objects enable VAV balancing, which is a calibration procedure that ensures measured airflow accurately tracks the airflow that the controller is supplying, among other tasks. Behind the scenes logic and bindings may also be built into an equipment controller to facilitate automation of equipment commissioning.

In accordance with one or more embodiments, a commissioning application or tool is provided either on the mobile device 102 (and also on the computing system 108) that can interact with the objects and underlying logic in the TCU controllers 110A, 110B to automate various configuration processes, such as VAV balancing. As discussed in more detail herein, the commissioning tool can selectively enable users to fulfill specifically authorized HVAC roles or personas involved in the installation, commission, maintenance and diagnosis of HVAC equipment. The commissioning tool can communicate with the controllers of the HVAC equipment (e.g., TCU controllers 110A, 110B) at various stages of a project to perform various tasks. These tasks may include device setup/configuration, management of child devices (e.g., control sensors 106, other room units, etc.), management of device firmware, device diagnostics, "bottom-up" deployment of control applications, I/O checkouts, commissioning activities, VAV balancing activities, among other tasks.

Referring still to FIG. 1A, the control applications that control operation of the HVAC equipment can be created in the control node 116 and downloaded as an image to the equipment controllers (e.g., the TCU controllers 110A, 110B). This function is one of several provided by the control node 116 to facilitate automating HVAC equipment commissioning and configuration. Such functions include a user accounts administration function 130, an HVAC roles/personas management function 132, a device image and object configuration function 134, a commissioning tool activation function 136, and a commissioning activities logging function 138.

In general, the user accounts administration function 130 allows a user to create an account for a building or facility to be commissioned or maintained, set security credentials, and perform other account related tasks. Once an account is created, the user may log on, request to be approved for one or more roles/personas, receive and send correspondence from and to the facility owner or manager, as well as access commissioning related files, data, and documents the user has been authorized to access by the facility owner or manager. The facility owner or manager may then approve the user for all the requested roles/personas or only some of the requested roles/personas for example based on the level of skill, training, and experience. The user accounts administration function 130 also allows the facility owner or manager to perform various administrative tasks related to the user's account.

The HVAC roles/personas management function 132 allows the facility owner or manager to create or define the roles/personas to be fulfilled by users. For example, the facility owner or manager may create or define the roles/personas of technicians, electricians, mechanics, flow balancers, and the like. The facility owner or manager may assign (or remove) specific workflows and commissioning related tasks to each role/persona. For example, electricians can only perform I/O checkouts, while flow balancers can only perform flow balancing, whereas technicians can perform all related commissioning activities. Thus, the various roles/personas have different but potentially overlapping privileges in the commissioning tool, depending on how the roles/personas were set up by the facility owner or manager. However, all roles/personas may be allowed to access and download device images and objects to the HVAC equipment to be configured. This is commonly known as "bottom-up" deployment and is particularly useful in newly installed or pre-commissioning cases where the TCU controllers 110A, 110B need to be calibrated but are not yet connected to the control node 116 (BMS server).

The device images and objects configuration function 134 allows engineers to create and modify objects and the control applications that are based on these objects. The control applications and objects therein may then be downloaded from the control node 116 and deployed on the TCU controllers 110A, 110B. Each object may be associated with a particular role/persona or a certain task to be performed by the role/persona so that once the object is deployed to the TCU controllers 110A, 110B, only a user who has been authorized to fulfill the role/persona may perform a task associated with that object. To this end, the commissioning tool activation function 136 can limit which role/persona is activated on the commissioning tool used by the user according to the role/persona for which user has been authorized.

The commissioning tool activation function 136 allows the facility owner or manager to selectively authorize specific roles/personas for the users on the commissioning tool. This ensures that only users who are trained and qualified to fulfill a particular role/persona can use the commissioning tool to perform that role/persona. Then, when the user first sets up the commissioning tool on the mobile device 102 (or computing system 108), the commissioning tool contacts the control node 116 to determine which role/persona has been approved for the user. The commissioning tool activation function 136 instructs the commissioning tool which role/persona to activate for the user. The user thereafter will only be able to use the commissioning tool to perform workflows and tasks associated with that role/persona (i.e., via the roles/personas management function 132).

As for the commissioning activities logging function 138, this function tracks and stores which workflows and tasks were performed by which users, when the workflows and tasks were completed, and the data resulting therefrom. This information may be provided by the commissioning tool of the various users either in real time or on a delayed basis and may be used for confirmation, diagnostic, schedule tracking, and other purposes.

FIG. 1B depicts an exemplary commissioning tool 120 implemented as a mobile application or "app" that may be used with the mobile device 102 according to some embodiments. It should be noted that a version of the commissioning tool 120 discussed herein, but modified for a desktop or laptop, may also be used on the computing system 108 in some embodiments. Such a commissioning tool 120 may be downloaded from a suitable online marketplace, such as the Apple App Store or Google Play, and executed on the mobile device 102 to connect or pair the mobile device 102 to the sensor module 106 (via the wireless adapter 104). Once paired, the user can wirelessly control the TCU controllers 110A, 110B to perform commissioning of the via the sensor module 106.

In some embodiments, the commissioning tool 120 may be a voice-enabled commissioning tool. This allows the user to use voice commands to verbally configure the TCU controllers 110A, 110B, thereby making his/her hands advantageously available for other uses (e.g., controlling instruments, etc.). The voice commands may be customized commands or commands that use words and phrases specifically selected for performing the workflows and tasks involved in commissioning HVAC equipment (as opposed to general usage voice commands).

As FIG. 1B shows, the commissioning tool 120 is composed of several functional components, including a user interface 122 and a hosting routine 124 employing a standard building management communication protocol stack therein. The communication protocol stack in the exemplary embodiment of FIG. 1B is a BACnet stack that implements Yet Another BACnet Explorer (YABE), which is a small graphical explorer program written in C # for browsing BACnet objects, although other communication protocol stacks may certainly be implemented. These functional components allow the commissioning tool 120 to provide a user, whether acting in the role (or persona) of a commissioning agent, flow balancer, technician, or the like, with a workflow that guides the user through various commissioning steps for different HVAC equipment. The functionality provided by the commissioning tool 120 can be better understood by reference to the user interface 122, a more detailed example of which is shown in FIG. 1C.

Figure 1C:
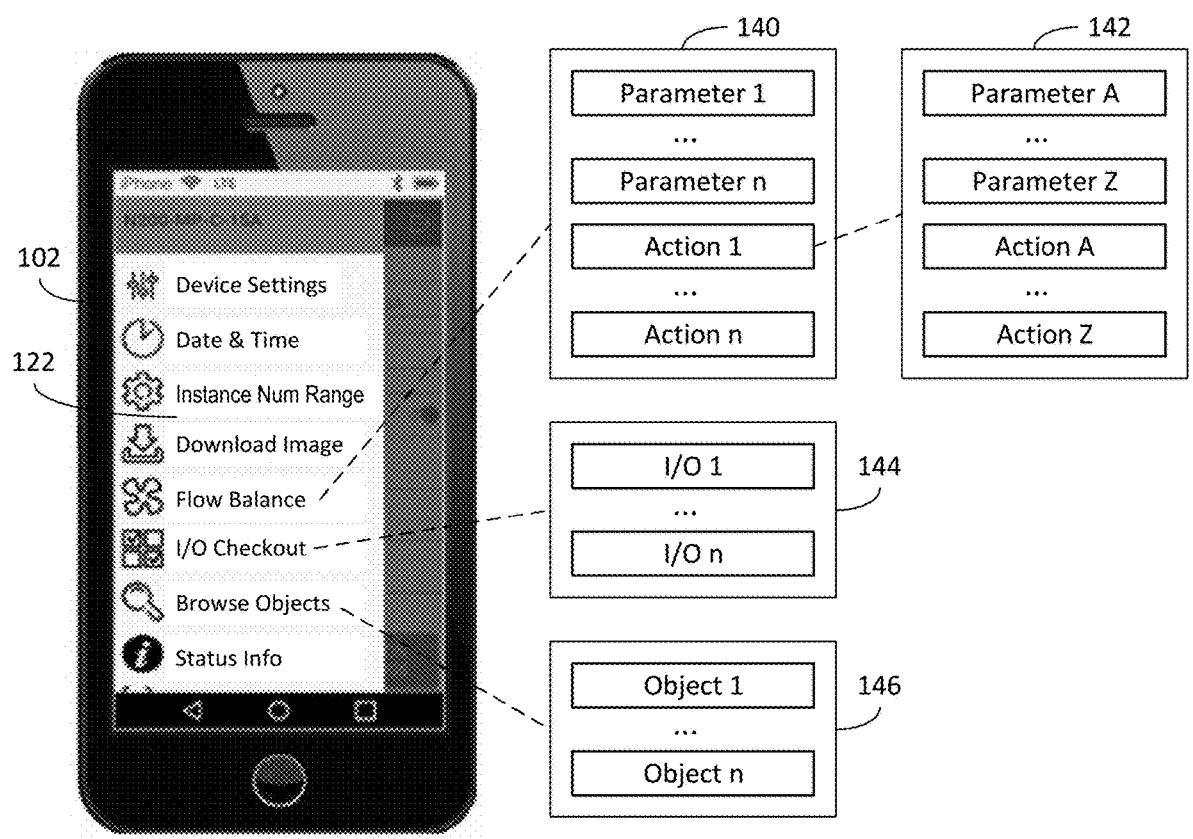
FIG. 1C illustrates an exemplary mobile device user interface configured to enable intelligent commissioning in the network system of FIG. 1A in accordance with an exemplary embodiment of the present disclosure.

Referring to FIG. 1C, the exemplary user interface 122 of the commissioning tool 120 provides a user with a number of selectable options. These options are displayed here as a list for illustrative purposes, but those skilled in the art will understand that other designs and layouts may instead be used for the user interface 122. In the embodiment shown, the user interface 122 allows the user to perform device and object discovery, commissioning, and configuration of equipment controllers, to configure, save, and reuse common network communications settings for the equipment controllers, and to balance VAV boxes controlled by the flow controllers, among other tasks. The user interface 122 also allows the user to download a control application image file to a controller, perform I/O checkout for the controller, and browse and/or edit objects in the controllers. Additionally, the user interface 122 allows the user to view status information related to the controllers, capture device data from the info labels on the controllers using the camera on the mobile device 102, view diagnostic files saved in the controllers, and perform a warm or cold restart of the controllers. In some embodiments, one or more of the above functions may be restricted depending on the roles (or personas) for which the user is authorized based by his/her security credentials.

Each option in the user interface 122 may have a separate workflow that uses or is based on the objects in the controller. Different equipment controllers with different objects thus have different workflows or sets of workflows, such that workflows for VAV box objects differ from workflows for fan coil objects, and the like. Selecting one of the options takes the user to the specific workflow for that option. For example selecting the flow balance option takes the user to a flow balancing screen 140 where the user may set one or more parameters and perform one or more actions related to flow balancing. Performing one of these actions may take the user to a second flow balancing screen 142 where the user may set one or more additional parameters and perform one or more additional actions, and so on. Likewise, selecting the I/O checkout option takes the user to an I/O checkout screen 144 where the user may confirm and/or modify one or more inputs and outputs of the controller. Similarly, selecting the browse objects option takes the user to a browse object screen 146 where the user may scroll through a list of available objects in the controller.

Figure 2A:
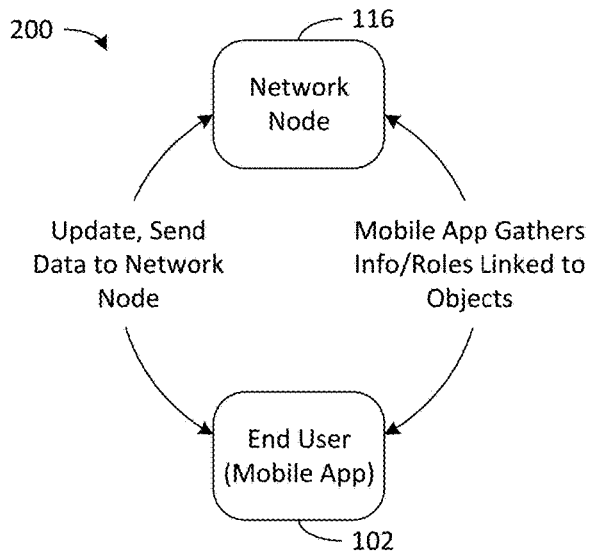
FIG. 2A illustrates an exemplary method for intelligent commissioning at a network node in accordance with an exemplary embodiment of the present disclosure.
Figure 2B:
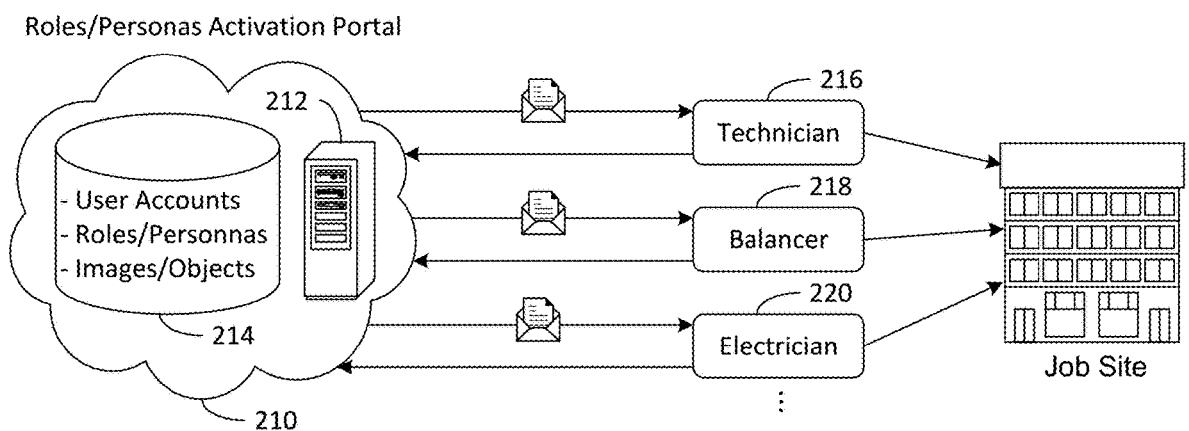
FIG. 2B illustrates an exemplary portal for intelligent commissioning at a network node in accordance with an exemplary embodiment of the present disclosure.

With reference now to FIGS. 2A and 2B, high level diagrams of an exemplary method for intelligent commissioning at a network node is depicted in accordance with the present disclosure.

FIG. 2A shows a basic flow diagram 200 relating the basic interaction between the network node (control node 116) and end user (mobile device 102) for the intelligent commissioning system 100 in accordance with the present disclosure. In general, an end user using the mobile device 102 accesses the control node 116 via a mobile app (commissioning tool) running on the mobile device 102. The mobile device 102 (via the commissioning tool) gathers and obtains objects from the control node 116 pertaining to a second network node (TCU controller, not shown) based on the roles/personas approved for the user. The end user may then configure the second network node using the workflows that are based on or associated with the objects in the second network node and update and report the configuration to the control node 116 using the mobile device 102.

In some embodiments, the role/persona approvals may be implemented using an online portal, an example of which is shown in FIG. 2B. The figure shows an online roles/personas activation portal 210 that is set up to manage the authorization and approval of user roles/personas in the commissioning tool. The activation portal 210 may reside on a cloud-based server or on a local server (indicated at 212), and may also be separate from the control node 116 or integrated in the control node 116. One or more databases 214 may be linked to the activation portal 210 to store user accounts, roles/personas, images and objects, and other files, documentation, training videos, and technical materials. Users may then access the activation portal 210 to set up an account and request a particular role/persona. The users shown in this example include a technician 216, a flow balancer 218, and an electrician 220, but other users (e.g., lighting installer) may access the activation portal 210 as well.

In some embodiments, the activation portal 210 is implemented as a website to which the users 216, 218, 220 may simply browse using their mobile device (or computing system). At the website, the users 216, 218, 220 may fill in a form with relevant personal and job-related information and request approval for a particular role/persona. Submitting the form launches a process that causes an e-mail to be sent to the users 216, 218, 220 containing a brief introduction of the project, an activation code (or other digital security mechanism), and a link to a website where the commissioning tool may be downloaded (e.g., Apple App Store, Google Play, etc.). The e-mail may further include a link to proprietary technical training materials (e.g., videos, manuals, guides, etc.) on how to perform various workflows and tasks specifically related to the requested role/persona.

The activation code is uniquely linked to a specific user 216, 218, 220 and is valid and effective only for the role/persona requested by the user in some embodiments. In other embodiments, it may be expedient to provide a group activation code (e.g., for all personnel from a certain subcontractor) that may be used by multiple users for multiple roles/personas. In some embodiments, the activation code may also be made available to the user at the activation portal 210 instead of or in addition to an e-mail.

A user 216, 218, 220 may then download and install the commissioning tool on his/her mobile device (or computing system) and activate the commissioning tool using the activation code. Upon being activated, the commissioning tool may contact the activation portal 210 or otherwise notify the server 212 to update the one or more databases 214 to reflect that the user 216, 218, 220 is now approved for the requested role/persona. The user 216, 218, 220 may thereafter proceed to a job site to perform the workflows and tasks associated with his/her approved role/persona. The commissioning tool will subsequently log all data resulting from and actions associated with the workflows and tasks performed by the user for analysis and reporting in the controller and or the server 212 for traceability.

The above role-based activation of the commissioning tool provides several benefits and advantages. For one thing, the provision of technical training materials directly to the user for a given role/persona together with the use of workflows and tasks in the commissioning tool to guide the user helps minimize or eliminate any need for the user to have prior knowledge of or experience relating to a particular controller or equipment. This significantly expands the pool of personnel available to work with the controllers and equipment on any given building project, thus providing building owners and facility managers (and third-party partners) with tremendous flexibility in staffing projects. Another benefit is the ability to log and keep track of personnel who have been authorized and the roles/personas for which they were authorized. Yet another benefit is the ability to quickly report which users performed which tasks on which equipment at which job site and on which days. Additional benefits and advantages will be readily apparent to those having ordinary skill in the art upon review of the present disclosure.

Figure 3:
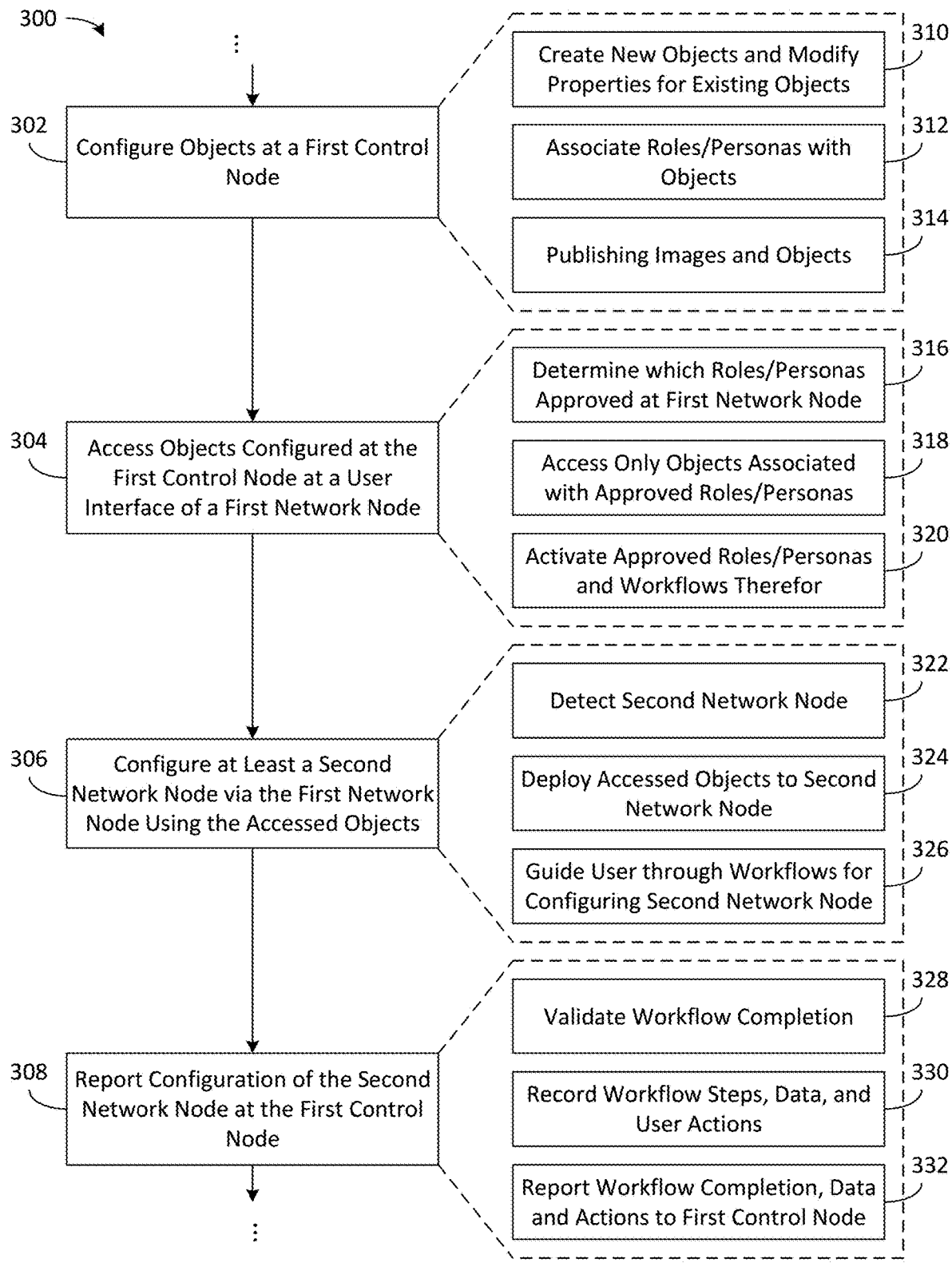
FIG. 3 illustrates a more detailed exemplary method for intelligent commissioning in accordance with an exemplary embodiment of the present disclosure.

FIG. 3 shows a more detailed flow diagram 300 of an exemplary intelligent commissioning method in accordance with the present disclosure. The flow diagram 300 generally begins at block 302 where objects are configured at a first control node, such as the control node 116 depicted in FIGS. 1A-1C. This block may involve a number of parts, including creating new objects and modifying the parameters and properties of existing objects (block 310), associating specific roles/personas with the objects (block 312), and publishing (i.e., making available for access) the images for those objects and the control applications that use those objects (block 314). The latter part may involve simply making the images and objects available at the control node 116 for downloading by authorized personnel.

At block 304, the objects that were configured at the first control node are accessed and obtained by a user using a user interface at a first network node, such as the mobile device 102 depicted in FIGS. 1A-1C. This block may also involve several parts, including determining which roles/personas are approved for the user at the first network node (block 316), accessing the objects that are associated with the approved roles/personas (block 318), and activating only the roles/personas (and associated workflows) that have been approved for the user (block 320).

At block 306, the user uses the first network node to configure at least a second network node, using the objects that were obtained from the first control node. As with the previous blocks, this block may involve a number of parts, including detecting the second network node (block 322), deploying the accessed objects to the second network node (block 324), and prompting and/or stepping the user through the workflow or workflows for configuring the second network node (block 326).

Thereafter, the user reports the configuration of the second network node to the first control node using the first network node at block 308. Again, this block may involve several parts, including validating that the workflow or workflows for configuring the second network node were completed (block 328), recording all workflow steps taken, resulting data, and any other user actions performed (block 330), and reporting the completion of the workflows, the resulting data, and the user actions performed to the first control node (block 332).

As mentioned earlier, an intelligent commissioning system 100 operating in the manner described herein provides numerous advantages and benefits. For example, an end user (e.g., a system integrator) can access the control node 116 and select a persona (i.e., a role that is given permission to perform certain operations) to become activated. The intelligent commissioning system 100 can automate an end user's role to help perform flow balancing and deploy predefined objects in the controllers. The commissioning tool 120 uses the predefined objects to facilitate flow balancing and other commissioning tasks. The predefined objects can work together to make it easier to engineer, calibrate, and configure applications that provide flexibility for engineers. A benefit of the predefined objects and integration of the predefined objects with the intelligent commissioning system 100 is the ability to define identities in the objects such that the objects are known to the commissioning tool and the commissioning tool 120 does not need to "discover" the predefined objects. The predefined objects can be associated with types of tasks that the personas can perform. The predefined objects and/or tasks can apply to, for example, a flow balancer, the system integrator, and/or a technician. System integrators and/or technicians can have access to the functionalities associated with the predefined objects. Each predefined object can be linked to an operation such as flow balancing of a controller and the calibration of that controller. The system integrator, a technician, and/or balancer can be guided down a path or workflow (e.g., by the commissioning tool 120 based on the predefined objects) such that the system integrator, technician, and/or balancer does not need to know which predefined objects are being applied by the commissioning tool 120 and/or intelligent commissioning system 100. In other words, the system integrator, technician, and/or balancer can simply carry out predefined workflows using, for example, a mobile application and/or user-interface.

In one embodiment, the system integrator, the technician, and/or balancer implements the predefined workflows by pressing a tactile or touchscreen button on the user interface. For example, the system integrator, the technician, and/or balancer can log into (e.g., using a password or some other authentication process) a commissioning application or tool hosted at, for example, a network node (e.g., mobile device) and/or at a processing node and/or cloud-based or external control module configured to communicate with the intelligent commissioning system 100. The application or tool can recognize the system integrator, the technician, and/or balancer role and, based on the role, the commissioning tool can automatically populate the information the system integrator, the technician, and/or balancer needs (e.g., using predefined objects). For example, the system integrator, the technician, and/or balancer can select a persona. Based on the selected persona, a workflow can be populated at the network node (e.g., mobile device). The underlying predefined objects (e.g., defined at a control node) are used to guide the system integrator, the technician, and/or balancer through the parameter selection process. At the point of deployment, the system integrator, the technician, and/or balancer can retrieve configuration information from a control node and, using the commissioning tool hosted at, for example, a mobile device, can populate and/or configure a network node. After the network node has been configured, the configuration can be validated and reported at the control node (e.g., via the commissioning tool). In other words, there is a real-time status of what the system integrator, the technician, and/or balancer is doing. The above can be implemented as a cloud-based application.

In another embodiment, multiple projects can be running at a same time. The commissioning tool can be used to identify capacity and resources. For example, if there is an obstacle in project A because power is out, then the system integrator, the technician, and/or balancer can be re-routed to another project, for example, project B. In other words, the control node can use real-time updates (e.g., of the status of projects the system integrator, the technician, and/or balancer are working on) to optimize workflow and can further use the real-time updates to generate a mapping (e.g., complete tasks X, Y, Z at site A, B, C, etc.) for the system integrator, the technician, and/or the balancer. In addition, during the commissioning steps, loading of the complete application and/or control sequences of, for example, HVAC code maps, can include relevant customizations and programs, applications, etc., that relates to a particular portion of the system and/or control. That is, controllers can be customized using the commissioning tool.

In another embodiment, customized and proprietary "smart" objects can be developed and/or pre-loaded at a control node instead of standard predefined objects. In some embodiments, a wizard may be provided at a network node, the wizard being accessible by an end user at an interface of the network node. The wizard takes the end user through a step-by-step process. For example, the end user can drive the commissioning tool. The end user, via the commissioning tool, can implement a device discovery process. The discovery process recognizes controllers associated with and/or on the communication network. The end user, via the commissioning tool, can select a particular controller. On selection of the controller, objects and workflows are displayed to the end user at an interface of the network node.

Figure 4:
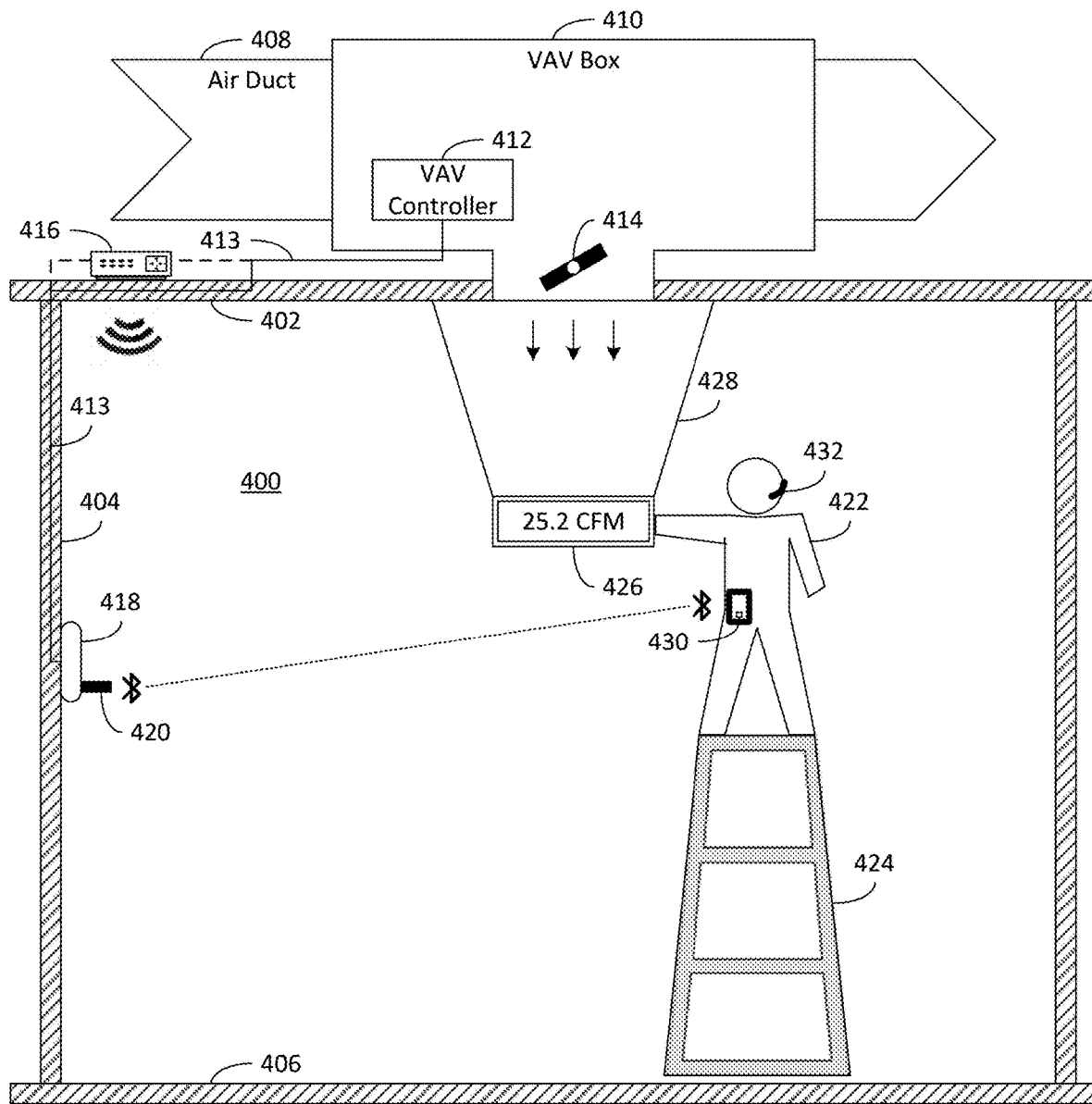
FIG. 4 illustrates an exemplary network system configured to enable voice-enabled intelligent commissioning at a network node in accordance with an exemplary embodiment of the present disclosure.

Referring now to FIG. 4, software applications can be configured to communicate with a control system to send control system commands and/or output control signals and/or data to facilitate the commissioning of a TCU controller. Further, the control system can receive data to facilitate the commissioning of a TCU controller. The software applications can be installed on a computing device such as a PC or mobile device. The software applications can include voice input and/or output capabilities that can use a wireless port on the computing device paired to a wireless headset with speakers and microphone worn by a technician. For example, a technician can use a voice-enabled application to connect to the control system. The technician can select the controller that he wants to balance. The technician can use a wireless headset to interact with the application. The application gives the user voice status and prompts for each step of the workflow. When complete, the technician can verbally command the system to save all calibration data and related data.

FIG. 4 depicts an exemplary scenario in which a voice-enabled commissioning tool may be used to commission a TCU controller. The exemplary scenario takes place in a room 400 having a ceiling 402, walls 404, and a floor 406. The room 400 is climate controlled by an HVAC system that pumps air through an air duct 408 to a VAV box 410 above the room 400. The amount of air flowing from the VAV box 410 into the room 400 is controlled by a VAV controller 412 that operates an airflow damper 414. The VAV controller 412 is connected to a temperature control sensor 418 mounted on one of the walls 404 via a wired network connection 413 (e.g., BACnet/IP, Ethernet, proprietary protocols, etc.) that allows the VAV controller 412 to communicate with the temperature control sensor 418. The temperature control sensor 418 is in turn connected to a wireless adapter 420 that allows other devices, including the mobile device 430, to access the VAV controller 412 through the control sensor 418. In alternative embodiments, it is also possible for the connection 413 to run instead through a network router 416 (see dashed lines) that connects the VAV controller 412 to the main building network. The latter case allows the mobile device 430 to connect directly to the VAV controller 412 and other controllers and devices connected to the network over a Wi-Fi connection.

The technician then uses a voice-enabled mobile commissioning app running on his/her mobile device 430 to connect to the wireless adapter 420. The mobile device 430 has a voice-enabled commissioning software application or tool running thereon. The voice-enabled commissioning tool is configured to allow the technician 422 while standing atop a ladder 424 and operating an airflow meter 426 attached to an airflow hood 428 to calibrate the VAV controller 412 via voice commands.

Where the mobile device 430 can "see" multiple controllers on the network, the user first selects a specific VAV controller 412 that he/she wants to calibrate, then uses a wireless headset 432 to interact with the voice-enabled commissioning tool on the mobile device 430 to calibrate the selected VAV controller 412. The mobile device 430 provides the technician 422 with voice status and prompts for each step of the calibration workflow. Following is an exemplary exchange between the mobile device 430 and the technician 422:

System: "Rotating damper to maximum airflow position. Standby."
    Technician puts the airflow meter (or manometer) on the diffuser.
    System: "Maximum airflow position achieved. Take airflow reading in CFM."
    Technician: "Airflow reading is 145 CFM."
    System: "Did you say that the airflow reading is 145 CFM?"
    Technician: "Yes."
    System: "Maximum airflow reading has been stored."
    System: "Rotating damper to minimum airflow position. Standby."

The technician 422 thereafter verbally commands the commissioning tool running on the mobile device 430 to save all calibration data for the VAV controller 412. As the above exchange shows, by making it possible for one person to use voice interaction to send commands to the TCU controller, receive status information from the TCU controller, and input calibration data to the TCU controller, significant reduction in time and labor may be realized.

In some embodiments, the voice-enabled commissioning tool can be customized to commission any HVAC controller, including a fan coil controller, heat pump control controller, VAV box controller, and like. This can be achieved by supplying the voice-enabled commissioning tool with a set of command words or phrases applicable to the commissioning tasks that need to be performed on the particular HVAC controller.

In some embodiments, the voice-enabled commissioning tool can provide an editor feature to allow users to create their own voice-prompted commissioning workflows. The user can create such custom voice-prompted commissioning workflows based on his/her experience regarding the most efficient and convenient way to carry out the commissioning, for example, by leaving out certain steps, adding other steps, and the like.

In some embodiments, the airflow meter 426 may be configured, or may be a type that is designed, to communicate directly with the commissioning software application to take readings electronically using Bluetooth or other wireless communication protocols. This would eliminate the need for a person to enter the data manually, resulting in less transcription errors and a faster process and furthermore fully automate calibration of the VAV controller 412 when the hood 428 is secured to the diffuser. Indeed, such arrangement would allow flow balancing to be performed almost entirely automatically, with little or no human intervention, when the airflow meter 426 and the airflow hood 428 are fixedly secured to the air vent.

In some embodiments, the voice-enabled commissioning tool allows a single technician to perform balancing of several VAV units in parallel by using several airflow balancing hoods and meters. In these embodiments, the voice-enabled commissioning tool would control the sequencing of the airflow damper 414 and automatically take measurements from each VAV unit after receiving verbal confirmation from the technician that the airflow meter 426 and airflow hood 428 are secured on each VAV unit.

Figure 5A:
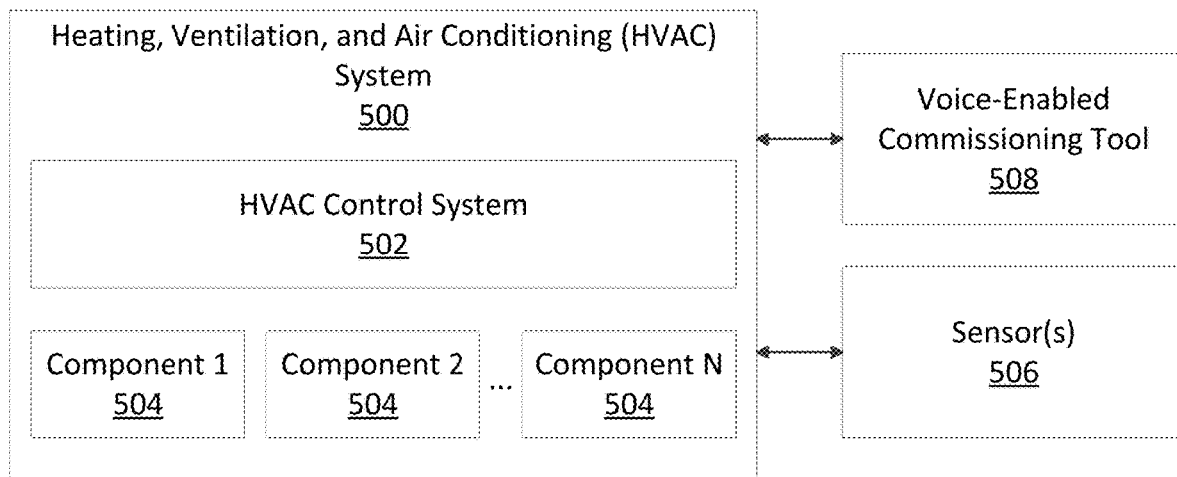
FIG. 5A illustrates an exemplary voice-enabled commissioning tool for intelligent commissioning at a network node in accordance with an exemplary embodiment of the present disclosure.
Figure 5B:
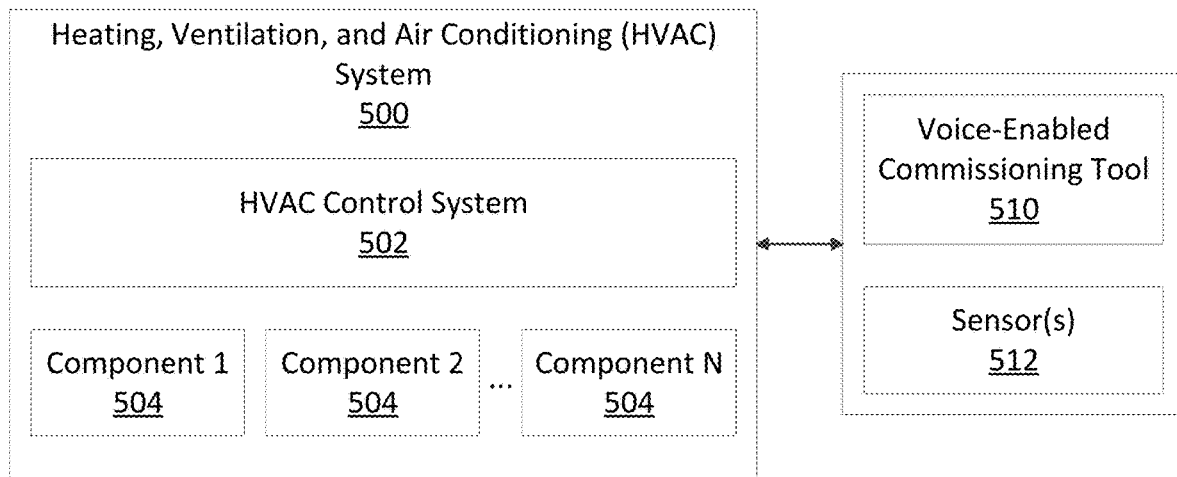
FIG. 5B illustrates an alternative voice-enabled commissioning tool for intelligent commissioning at a network node in accordance with an exemplary embodiment of the present disclosure.

FIGS. 5A and 5B are exemplary system architectures that may be used to implement the voice-enabled commissioning tool from FIG. 4 according to one or more of the embodiments disclosed herein.

Referring to FIG. 5A, an HVAC system 500 according to the disclosed embodiments can include an HVAC system control system 502 and a plurality of HVAC system components 504 connected to the control system 502. These components 504 can be any type of HVAC equipment commonly used in HVAC systems, such as VAV box units, fan coil units (FCU), heat pump units (HPU), and chilled beam units (CBU), including the respective controllers therefor. Similarly, the control system 502 may be any type of HVAC control system, such as a BMS server, which may be a local server or a cloud-based server. Climate control sensors 506, which may be wall-mounted room units in some embodiments, provide control signals that directly or indirectly (i.e., through the control system 502) control the various HVAC components 504 based on one or more environmental parameters (e.g., temperature, humidity, etc.) measured by the climate control sensors. The control system 502 stores predefined objects for configuring the HVAC components 504 that may be obtained by users according to their authorized roles (personas) to configure the components. Users may access the control system 502 (via their mobile devices) to obtain the predefined objects if needed, then connect to a voice-enabled commissioning tool 508 coupled to the climate control sensors 506 to configure the HVAC components 504 using voice commands.

In the embodiment of FIG. 5A, the voice-enabled commissioning tool 508 is separate from the climate control sensors 506. In these embodiments, the voice-enabled commissioning tool 508 needs to be paired or otherwise connected to one of the climate control sensors 506 in order to perform configuring of the HVAC components 504. In other embodiments, such as shown in FIG. 5B, it is possible to employ a voice-enabled commissioning tool 510 that is integrated with (i.e., residing in the same device as) one or more climate control sensors 512. Such an arrangement allows the voice-enabled commissioning tool 510 to directly communicate with the one or more climate control sensors 512 without the need for a wireless connection.

Figure 6A:
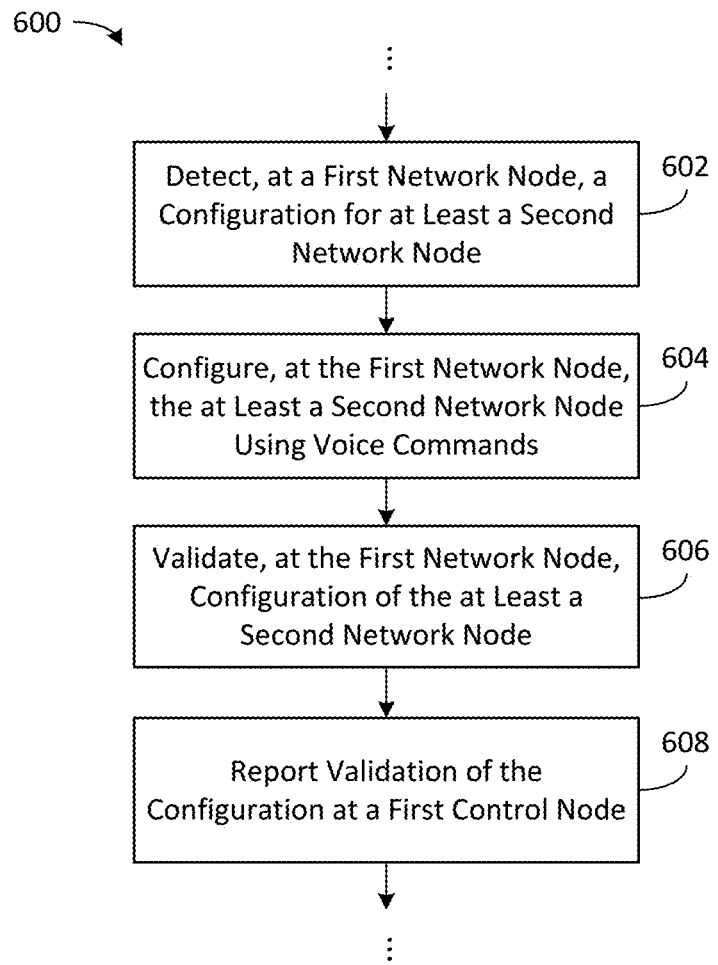
FIG. 6A illustrates a method for voice-enabled intelligent commissioning at a network node in accordance with an exemplary embodiment of the present disclosure.

An exemplary method of operating the voice-enabled commissioning tool is shown in FIG. 6A via a flow chart 600 in accordance with the present disclosure. The flow chart 600 generally begins at block 602, where at least a second network node is detected at a first network node. This may be accomplished by virtue of the first and second network nodes being in communication with each other using a suitable IP-based building communication protocol (e.g., BACnet/IP, Ethernet, etc.). In some embodiments, the at least a second network node may include one of the TCU controllers 110A, 110B (see FIG. 1A), while the first network node may be the mobile device 102 (see FIG. 1B).

At block 604, the first network node is configured using voice commands at the second network node. This may be accomplished in some embodiments by using a voice-enabled commissioning tool similar to the one discussed with respect to FIG. 4, where the tool uses voice prompts to guide the user through the configuration process. At block 606, the configuration of the first network node is validated at the second network node. This may be accomplished in some embodiments by the voice-enabled commissioning tool confirming that the at least a second network node is operating within an acceptable tolerance (e.g., ±10%) of a predefined threshold. Thereafter, at block 608, the validation of the configuration of the first network node is reported to a first control node. This may be accomplished in some embodiments by the voice-enabled commissioning tool sending its log to the first control node.

Figure 6B:
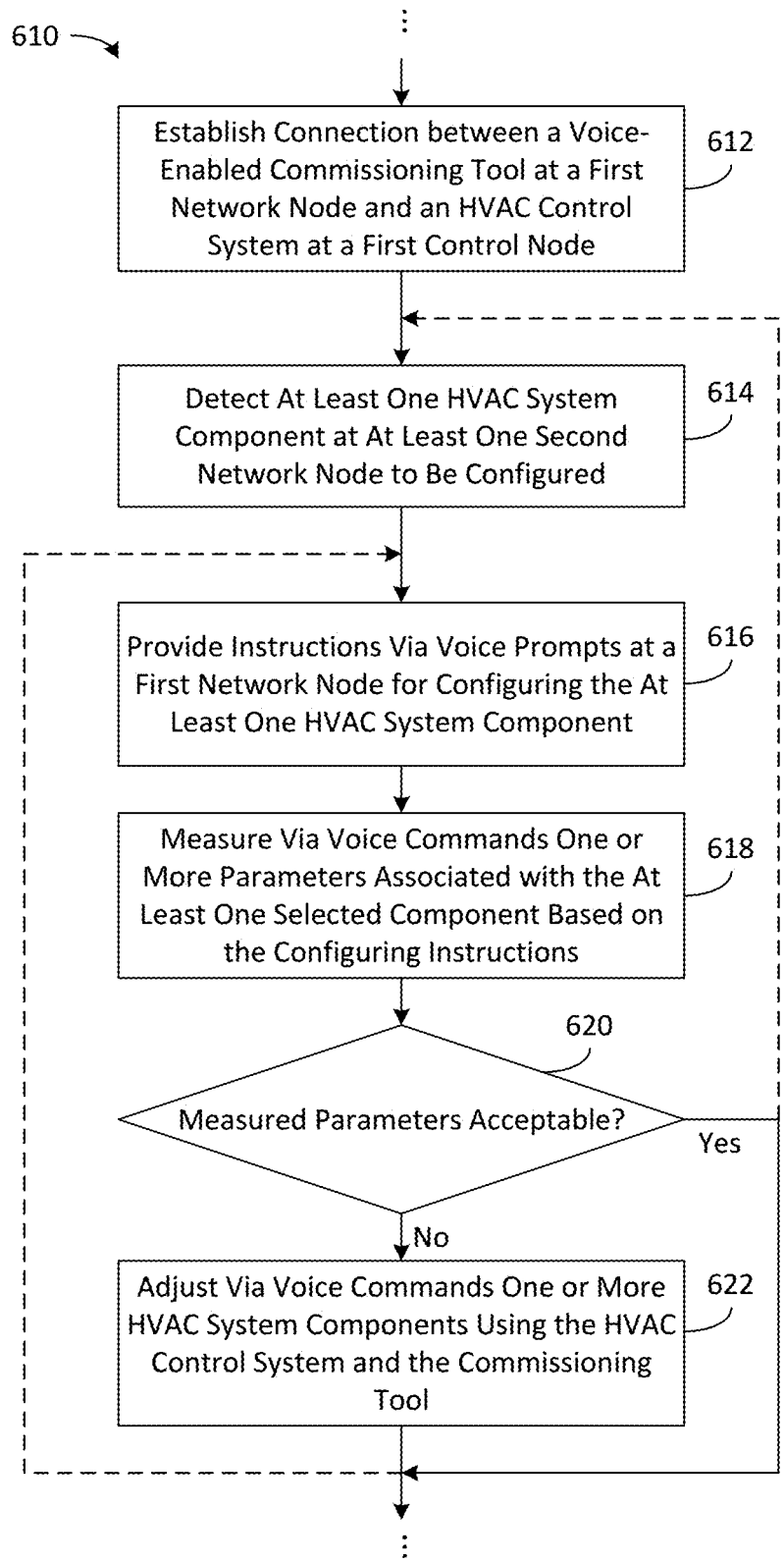
FIG. 6B illustrates the method for voice-enabled intelligent commissioning at a network node of FIG. 6A in more detail in accordance with an exemplary embodiment of the present disclosure.

A more detailed illustration of the exemplary method of operating the voice-enabled commissioning tool is shown via a flow chart 610 in FIG. 6B. The flow chart 610 generally begins at block 612, where a connection is established between a voice-enabled commissioning tool at a first network node and an HVAC control system at a first control node. At block 614, at least one HVAC system component at at least one second network node is detected, and at block 616, instructions for configuring the at least one selected HVAC system component at the at least one second network node is provided by the voice-enabled commissioning tool at the first network node. In some embodiments, the instructions are issued as voice prompts to the users, and the user responds to the voice prompts using verbal responses and voice commands.

At block 618, one or more parameters associated with the at least one HVAC component is measured based on the configuring instructions. In some embodiments, the measurements may be provided to the voice-enabled commissioning tool as verbal measurements. It is also possible in some embodiments for the measurements to be provided electronically to the voice-enabled commissioning tool by using a measurement instrument that has been configured to do so.

A determination is made at block 620 whether the measured parameters are acceptable within predefined tolerances (e.g., ±10%). If the determination at block 620 is no, then an adjustment is made to one or more of the HVAC system components at block 622. In some embodiments, the flow chart 610 may at this point return to block 616 (see dashed line) to obtain instructions for making the adjustment to the one or more HVAC system components. If the determination at block 620 is yes, then the flow chart 610 proceeds without making adjustments to any HVAC system components. Alternatively, in some embodiments, the flow chart 610 may at this point return to block 614 (see dashed line) to select another HVAC system component to configure.

Figure 7:
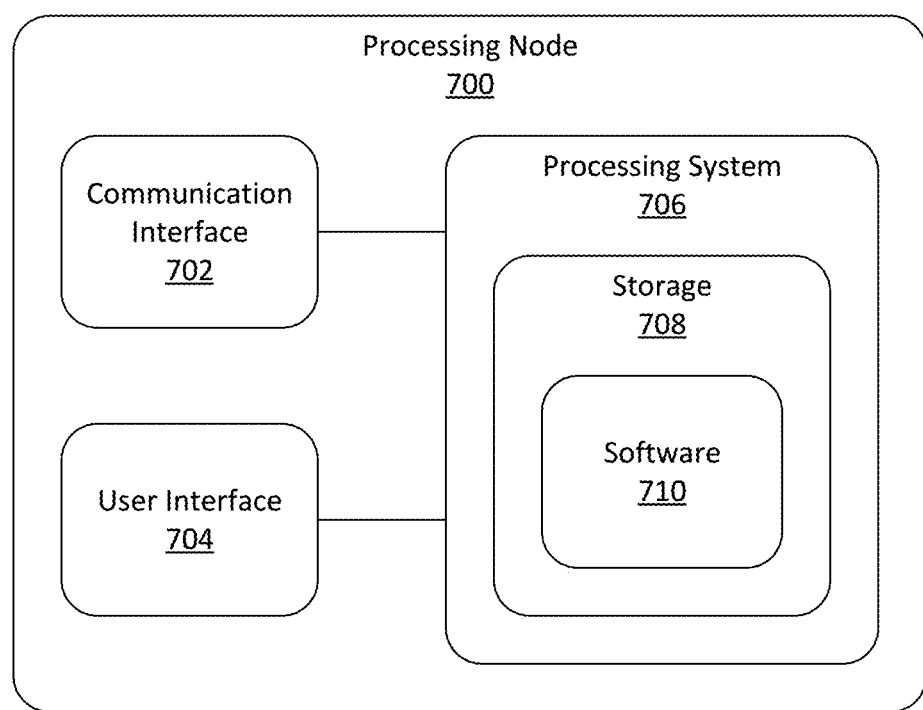
FIG. 7 illustrates an exemplary processing node may be used to implement voice-enabled intelligent commissioning at a network in accordance with an exemplary embodiment of the present disclosure.

FIG. 7 illustrates an exemplary processing node 700 in a network system that may be used to implement one or more aspects of the intelligent commissioning system 100 in accordance with an exemplary embodiment of the present disclosure. The processing node 700 can include a communication interface 702, user interface 704, and processing system 706 in communication with the communication interface 702 and the user interface 704. The processing system 706 includes a storage 708, which can comprise a disk drive, flash drive, memory circuitry, or other memory device. The storage 708 can store a software 710, which is used in the operation of the processing node 700. The software 710 can include computer programs, firmware, or some other form of machine-readable instructions, including an operating system, utilities, drivers, network interfaces, applications, or some other type of software. The processing system 706 can include a microprocessor and other circuitry to retrieve and execute software 710 from storage 708.

The processing node 700 can further include other components such as a power management unit, a control interface unit, and the like, which are omitted for clarity. The communication interface 702 permits the processing node 700 to communicate with other network elements and the user interface 704 permits configuration and control of the operation of the processing node 700.

Examples of aspects that may be implemented using the processing node 700 can include the network nodes 102, 104, 106, 108, 110A, 110B, 112, and/or 116 from FIG. 1A-1C. The processing node 700 can also be a component of a network element, such as a component of the network nodes 102, 104, 106, 108, 110A, 110B, 112, and/or 116. The processing node 700 can also be another network element in a network system. Further, the functionality of the processing node 700 can be distributed over multiple network elements of the network system.

The exemplary methods and systems described can be performed under the control of a processing system executing computer-readable codes embodied on a computer-readable recording medium or signals sent through a transitory medium. The computer-readable recording medium can be any data storage device that can store data readable by a processing system and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The signals transmitted through a transitory medium may include, for example, modulated signals transmitted through wired or wireless transmission paths.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. An intelligent control system for building automation controllers, the intelligent control system comprising:
a control node configured to control one or more building automation controllers; and
at least a first network node coupled to communicate with the control node, the first network node having a commissioning tool thereon, the commissioning tool configured to:
retrieve, via a user interface at the at least a first network node, objects configured at the control node, each object defining one or more configuration parameters for at least one of the building automation controllers;
configure at least one building automation controller with the one or more configuration parameters using at least one of the retrieved objects; and
report configuration of the at least one building automation controller at the control node;
wherein the control node is a building management system (BMS) server operable to control the one or more building automation controllers; and
wherein the at least one building automation controller includes at least one of the following: a VAV controller, a fan coil controller, and a heat pump controller.

2. The intelligent control system of claim 1, wherein the at least a first network node is a handheld mobile device configured to use the retrieved objects to configure the at least one building automation controller.

3. The intelligent control system of claim 2, wherein the commissioning tool uses a workflow to configure the at least one building automation controller, the workflow being based on the retrieved objects.

4. The intelligent control system of claim 3, wherein the workflow includes one of the following: an airflow balancing workflow, an I/O checkout workflow, and an object browsing and editing workflow.

5. The intelligent control system of claim 1, further comprising a room sensor configured to monitor a room climate and coupled to communicate with the at least one building automation controller, the room sensor further configured to receive a wireless adapter therein that allows the room sensor to communicate with the at least a first network node.

6. A method for intelligent commissioning of one or more building automation controllers, the method comprising:
receiving a request for approval of a selected user persona from a commissioning personnel via a first network node of the commissioning personnel, the user persona being selected by the commissioning personnel from among several user personas, each user persona associated with a separate commissioning activity for the one or more building automation controllers;
receiving a request from the commissioning personnel via the first network node to activate the selected user persona at the first network node;
issuing an activation code from a control node to the first network node for activating the selected user persona;
detecting, at the first network node, at least one building automation controller;
configuring, by the commissioning personnel via the first network node, the at least one building automation controller using the selected user persona;
validating, at the first network node, the configuring of the at least one building automation controller; and
reporting, via the first network node, validation of the configuring to the control node;
wherein the control node is a building management system (BMS) server operable to control the one or more building automation controllers.

7. The method of claim 6, wherein configuring the at least one building automation controller comprises retrieving, at the first network node, objects configured at the control node, the objects being authorized to be retrieved using the selected user persona.

8. The method of claim 6, wherein the selected user persona includes one of the following: a technician, a flow balancer, and an electrician.

9. The method of claim 6, further comprising reporting at the control node via the first network node that the selected user persona has been activated at the first network node.

10. The method of claim 6, wherein receiving the request to activate a selected user persona comprises receiving the request at an activation portal.

11. The method of claim 6, further comprising issuing training materials to the first network along with the activation code, the training material geared specifically for the selected user persona.

12. A method for configuring one or more building automation controllers, the method comprising:
    receiving a request for approval of a user persona from a user via a voice-enabled commissioning tool installed on a computing device of the user, the user persona being selected by the user from among several user personas, each user persona associated with a separate commissioning activity for the one or more building automation controllers;
    receiving a request from the user via the voice-enabled commissioning tool to activate the selected user persona at the voice-enabled commissioning tool;
    issuing an activation code to the voice-enabled commissioning tool for activating the selected user persona;
    establishing a connection between the voice-enabled commissioning tool and at least one building automation controller, the voice-enabled commissioning tool operable to configure the at least one building automation controller via user voice instructions;
    retrieving, via a user interface at the voice-enabled commissioning tool, objects defining one or more configuration parameters for the at least one building automation controller;
    configuring the at least one building automation controller with the one or more configuration parameters using at least one of the retrieved objects, wherein the configuring comprises:
    detecting the at least one building automation controller using the voice-enabled commissioning tool;
    providing voice instructions from the commissioning tool to the user via the computing device for configuring the at least one building automation controller on the voice-enabled commissioning tool, wherein the voice instructions are based on the type of the at least one building automation controller;
    measuring one or more parameters associated with the at least one building automation controller using at least one sensor device based on the provided instructions;
    determining, on the voice-enabled commissioning tool, if the one or more measured parameters are acceptable; and
    in response to determining that at least one of the one or more measured parameters is not acceptable, adjusting the at least one building automation controller using the voice-enabled commissioning tool.

13. The method of claim 12, further comprising measuring the one or more parameters;
    communicating the one or more measured parameters to the voice-enabled commissioning tool; and
    adjusting the at least one building automation controller based on the one or more measured parameters until it is determined that the one or more measured parameters are acceptable.

14. The method of claim 13, wherein communicating the one or more measured parameters to the voice-enabled commissioning tool includes audibly communicating the one or more measured parameters to the voice-enabled commissioning tool.

15. The method of claim 12, wherein determining if the one or more measured parameters are acceptable includes:
    comparing the one or more measured parameters to respective configuration values; and
    determining if the one or more measured parameters are within a predetermined range of the respective configuration values.

16. The method of claim 12, wherein the instructions are stored on a memory device associated with the voice-enabled commissioning tool, and the instructions include stored configuration data.

17. The method of claim 12, wherein the at least one building automation controller is one of a fan coil controller, a heat pump controller and a VAV box controller, further comprising customizing the instructions to use voice commands that are specific to the fan coil controller, the heat pump controller or the VAV box controller.

18. The method of claim 12, wherein the instructions comprise a predefined set of voice prompts, further comprising creating a personalize set of voice prompts and replacing the predefined set of voice prompts with the personalized set of voice prompts.

19. The method of claim 12, further comprising fixedly securing the sensor in place over an air vent, wherein the measuring of one or more parameters is performed automatically without human intervention.

20. A system for intelligent commissioning of one or more building automation controllers, the system comprising:
    a first network node; and
    a control node configured to:
    receive a request for approval of a selected user persona from a commissioning personnel via the first network node, the user persona being selected by the commissioning personnel from among several user personas, each user persona associated with a separate commissioning activity for the one or more building automation controllers;
    receive a request from the commissioning personnel via the first network node to activate the selected user persona at the first network node;
    issue an activation code to the first network node for activating the selected user persona;
    wherein the first network node is configured to detect at least one building automation controller and allow the commissioning personnel to configure the at least one building automation controller using the selected user persona via the first network node;
    wherein the first network node is further configured to validate the configuring of the at least one building automation controller and to report the validation to the control node; and
    wherein the control node is a building management system (BMS) server operable to control the one or more building automation controllers.

* * * * *